United States Patent

Takarabe

[15] 3,662,889
[45] May 16, 1972

[54] WATER CLEANER

[72] Inventor: Shigehiro Takarabe, 5-28, Nishi, 3-chome Omori, Ota-ku, Tokyo, Japan

[22] Filed: June 18, 1970

[21] Appl. No.: 47,213

[30] Foreign Application Priority Data

Dec. 25, 1969 Japan..............................44/122397
Dec. 26, 1969 Japan..............................44/123062

[52] U.S. Cl.................................................210/169, 119/5
[51] Int. Cl..............................................................E04h 3/20
[58] Field of Search.....................................119/5; 210/169

[56] References Cited

UNITED STATES PATENTS

| | | | |
|---|---|---|---|
| 2,888,205 | 5/1959 | Trucco | 119/5 |
| 2,137,397 | 11/1938 | Haldeman | 210/169 |
| 2,335,756 | 11/1943 | Haldeman | 210/169 |
| 2,827,268 | 3/1958 | Staaf | 210/169 |
| 3,541,765 | 11/1970 | Adler et al. | 55/387 |

*Primary Examiner*—Charles N. Hart
*Attorney*—Polachek & Saulsbury

[57] ABSTRACT

The present invention provides a water cleaner for automatically circulating the water body in a pond or the like for keeping of fishes for amusement and/or food for filtration, purification, and aeration. A filter unit driven by a motor may be located at any depth and position in the pond in a very stabilized manner. A lighting unit is installed above the water surface so as to facilitate the feed, viewing, and luring fishes at night.

3 Claims, 3 Drawing Figures

PATENTED MAY 16 1972
3,662,889
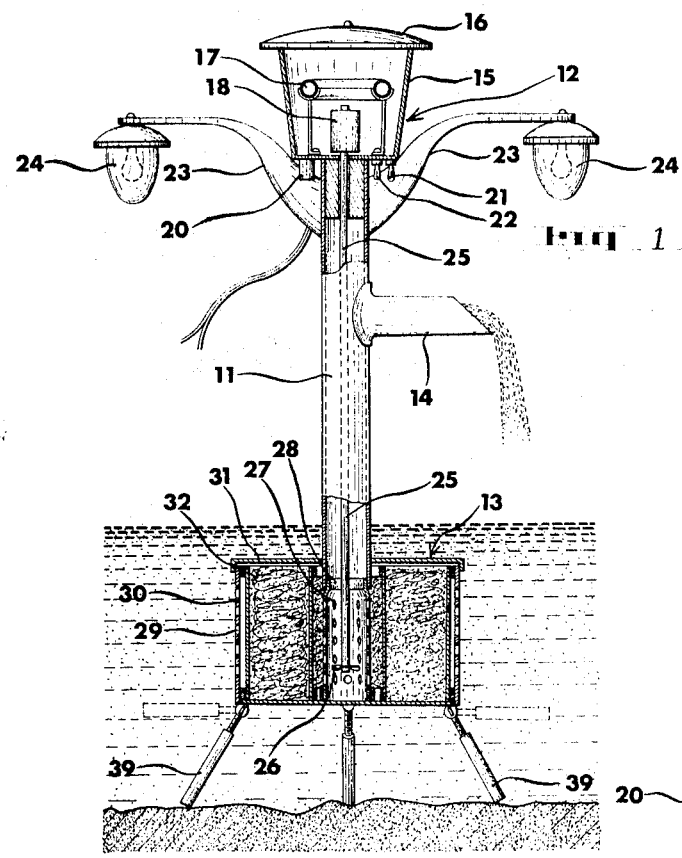
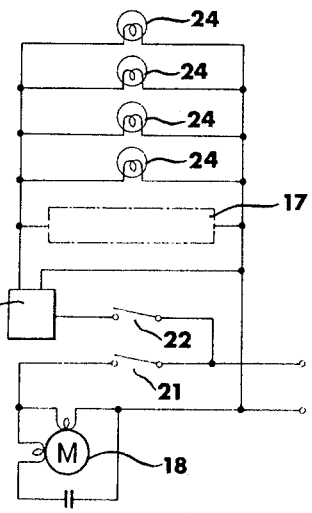
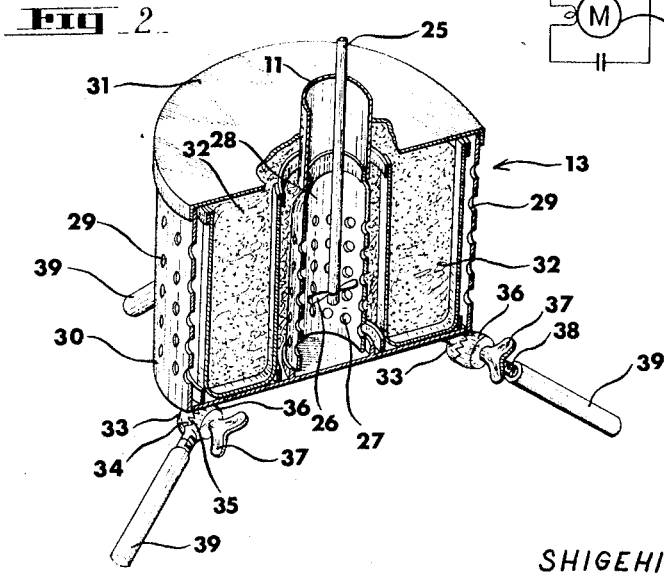
INVENTOR
SHIGEHIRO TAKARABE
BY Polachek & Saulsbury
ATTORNEYS

WATER CLEANER

BACKGROUND OF THE INVENTION

The present invention relates to a water cleaner for filtration, purification, and aeration of the water body in a pond or the like for keeping of fishes for amusement and/or food.

It is difficult to remove the microscopic algae, microflorae, floating matters, etc. from the water body in a pond or the like for keeping fishes for food. Especially in the pond or the like whose water body is not changed, the growing of the microscopic algae, microflorae, etc. and the pollution of the water body are much enhanced, but the removable or these microflorae, microsclopic algae, etc., that is the filtration and purification of the water are very difficult. The fishes cannot endure such conditions developed in the standing water body. Furthermore, the light transmission is must affected adversely by the water pollution and growing of the microscopic algae and microfloae so that the viewing the pet fishes is adversely affected. For the keeping of the fishes for amusement and food, the aeration is essential especially in a pond or the like whose water body is not changed, in order to add oxygen to the water and remove the undesired compounds such as carbon dioxide, etc. therefrom.

SUMMARY OF THE INVENTION

The present invention therefore contemplates to provide a water cleaner for automatically circulating the the water in the pond of the like for filtration, clarification, and purification of the type in which a filter unit is located in the water in such a manner that the water filtered and purified by the filter unit is returned from a portion of the water cleaner above the water surface so as to accomplish the aeration. According to the present invention, the water cleaner is further provided with leg members which are adapted to locate the filter unit at a desired depth and in the horizontal position even when the surface of the bottom is irregular. The water cleaner is further provided with a lighting equipment above the water surface so as to facilitate the viewing and feeding of the fishes at night.

It is therefore the primary object of the present invention to provide a water cleaner adapted to be located in the pond or the like for keeping the fishes for amusement and food, of the character in which the water body in the pond or the like is automatically circulated through the water cleaner, thereby filtering, clarifying the water and the filtered water is ejected and dropped upon the water surface thereby effecting the aeration of the filtered water so as to add oxygen to the water.

Another object of the present invention is to provide a water cleaner of the character including the filter unit, a pump unit driven by a motor, a water discharge unit, etc. and being readily portable by one operator so as to be located at any suitable position in the pond or the like.

Another object of the present invention is to provide a water cleaner of the character described above and having legs extending from the four corners of the bottom of the water cleaner, each of the leg members being rotatably fixed to the bottom so that depending upon the setting depth and the irregular bottom surface, the lengths and the angular positions of the leg members may be suitably selected, whereby the water cleaner may be located at a desired depth and horizontal position in a stabilized manner when the leg members are locked in position.

Another object of the present invention is to provide a water cleaner of the character described above and having a lighting equipment for facilitating the feeding, luring, viewing, etc. of the fishes during the night, the lighting equipment including a lamp installed at the top of a main pipe extending above the water surface and a plurality of lamps fixed to the free ends of brackets extending from the top of the main pipe.

The above and other objects, features and advantages of the present invention will become more apparent from the following description of the preferred embodiment thereof taken in conjunction with the accompanying drawing.

BRIEF DESCRIPTION OF THE DRAWING

FIG. 1 is a side view, partly in section, of a water cleaner in accodance with the present invention set in a pond;

FIG. 2 is a perspective view partly in section of a filter unit thereof; and

FIG. 3 is a circuit diagram of an electrical unit thereof.

DESCRIPTION OF THE PREFERRED EMBODIMENT

The present invention will be described with reference to the purification and filtration of a water body in a pond.

Referring to FIG. 1, an electrical unit 12 is carried at the top portion of a hollow main pipe 11 and a filter unit 13 is carried at the lower portion of the hollow main pipe 11. A water discharge pipe 14 is extended substantially from a mid-portion of the pipe 11. The electrical unit 12 is enclosed by a glove 15 made of a transparent material such as glass or plastic. The top of the unit 12 is covered with a shade 16 having a suitable configuration. Within the unit 12 are arranged a conventional circular neon tube 17, a small-sized motor 18, a capacitor 19, a flasher 20, a switch 21 for the motor 18, a switch for the neon tube 17, etc. The circuit diagram of the electriccal unit 12 is shown in FIG. 3, in which reference numerals 24 designate illumination lamps.

Brackets 23 are extending substantially horizontally from the top portion of the main pipe 11 and below the electrical unit 12 so as to support the lamps 24, which are electrically interconnected with the electrical unit through the wires extended through the brackets 23. A number of lamps 24 and the length of the bracket 23 may be suitably selected depending upon the size of a pond or the like into which is installed the water cleaner of the present invention.

A main drive shaft 25 extending through the main pipe 11 has its upper end connected to the rotary shaft of the motor 18 and rotary vanes for water pumping are carried by the main shaft 25 at the lower end thereof.

An inner cylinder 28 having a plurality of apertures 27 is disposed coaxially of the main drive shaft 25 in spaced apart relation therewith and adjacent to the lower end of the main pipe 11. It should be noted that the rotary vanes 26 rotate in the lower portion of the inner cylinder 28. Both of the lower end portion of the main pipe 11 and the apertured inner cylinder 28 are closely fitted into the filter unit 13 in coaxial relation therewith. The filter unit 13 further includes a large diameter outer cylinder 30 having a bottom and a plurality of small diameter openings 29 formed therethrough, a cover 31 closing the upper end of the large diameter outer cylinder 30 and a filter material 32 made of soft fibers and packed within the filter unit 13.

The microscopic algae, the microflorae and other foreign matters suspended in the water body may be filtered by the filter material 32, whereby the water body in the pond may be purified. Therefore, the water may be maintained in the best condition for growing the plankton and other microorganism which are the natural foods of the fishes.

When the filter 32 is used for a long time, it will be clogged so that the filtration efficiency will be decreased. It is therefore required to detach the filter material 32 once to twice a year so as to clean the impurities attached thereto, thereby maintaining the filter material in the best condition all the time. To facilitate the cleaning of the filter material 32, the large diameter outer cylinder 30, the cover 31, the main pipe 11, and the apertured inner cylinder 28 are all detachably assembled as best shown in FIG. 2.

Four stationary connection members 33 are securely fixed equiangularly to the bottom of the large diameter outer cylinder 30 and each of the stationary connection members 33 has ridge portions 34 formed at the free end thereof. An adjustment screw 36 has a movable connection member 35 having the ridge 35 adapted to mate with the ridge portions 34 of the fixed connection member 33 and and externally threaded rod 38 laterally extending therefrom. Both of the stationary and movable connection members 33 and 34 are connected with each other by tightening the adjustment screw 37 and a leg member 39 which is shown as being internally threaded is screwed over the externally threaded rod 38. It is readily seen that when the adjustment screw 37 is loosened, the ridge portions 34 and 35 are disengaged from each other and then the movable connection member 36 is rotated away from the fixed connection member 34 so that the movable connection member 36 may be angularly displaced relative to the fixed connection member 33 together with the leg 39, whereby each or all of the legs 39 may be suitably positioned both horizontally and vertically. That is, depending upon the depth of the pond, the legs 39 may be suitably positioned so that the filter unit 13 may be securely maintained in the horizontal position even when the surface of the bottom is irregular.

When the filter unit 13 is suitably positioned in the water and the rotary vanes 26 in the cylinder 28 are driven by the motor 18, the pond water which is filtered through the filter material 32 from the small diameter apertures 29 of the large diameter outer cylinder 30 into the inner cylinder 28 is caused to be pumped upwardly in the main pipe 11 to the discharge pipe 14 from which the purified water is returned into the pond. It is seen that when the water is circulated many times in this manner as described above, the impurities such as microflorae, microscopic algae and so on may be all attached by the filter material 32, whereby the water may be purified. Since the purified water is returned from the discharge pipe 14, the aeration of the purified water may be effected when the water is dropped from the discharge pipe 14 to the surface of the pond, whereby oxygen is added into the water and the undesired impurities are removed from the water. Therefore, the water body in the pond may be maintained in the best conditions suited for the growing of the fishes.

A considerably large area of the surface of the pond may be well illuminated by the lamp 17 at the top of the water cleaner and by the lamps 24 fixed to the brackets 23 so that the fish luring, the fish viewing, the fish feeding, etc. are much facilitated.

It will be readily understood that the filter material 32 packed in the filter unit 13 may be readily removed therefrom only when the cover 31 is removed. And the repair and cleaning of other structural parts may be much facilitated.

The present invention has been so far described with particular reference to the preferred embodiment thereof, but it will be understood that variations and modifications can be effected without departing from the true spirit of the present invention as described hereinabove and as defined in the appended claims.

What is claimed is:

1. A water cleaner used in a pond or the like including an electrical unit installed at the top, a filter unit installed at the bottom, and a water discharge port installed at the mid-portion of a vertically extending hollow main pipe; a lamp and a motor housed in said electrical unit; vanes for pumping up the water disposed in an inner cylinder coaxially disposed in said filter unit and driven by a drive shaft coupled to said motor; a filter material being packed in said filter unit, said filter unit being readily dismountable; and leg members angularly movably fixed to the four corners of the bottom of said filter unit; including a plurality of lamps for lighting fixed to the free ends of brackets extending outwardly from said electrical unit; and said filter unit comprising an outer cylinder having a bottom, said filtering material packed into said outer cylinder, a cover detachably fitted over said outer cylinder, said inner cylinder coaxially fitted into said outer cylinder, and said main pipe coaxially fitted through said cover into said outer cylinder and over or into said inner cylinder so as to be readily detached therefrom, and said water discharge port comprising a pipe extending horizontally outwardly of said main pipe.

2. A water cleaner of the character described in claim 1 wherein said electrical unit at the top of said vertically extending main pipe has two switches for turning on and off said motor and said lamps respectively and is enclosed by a transparent glove with a cover.

3. A water cleaner of the character described in claim 1 wherein each of said leg members has an externally threaded rod and an internally threaded member so that the latter may be axially slightly moved toward and away from the bottom of said filter unit.

* * * * *